(12) United States Patent
Moore et al.

(10) Patent No.: US 9,314,699 B2
(45) Date of Patent: Apr. 19, 2016

(54) SYSTEMS AND METHODS FOR APPLYING GAME MECHANICS TO THE COMPLETION OF TASKS BY USERS

(75) Inventors: Alexander Moore, Mountain View, CA (US); Aye Moah, Mountain View, CA (US); Michael Chin, Mountain View, CA (US)

(73) Assignee: BAYDIN, INC., Mountain View, CA (US)

( * ) Notice: Subject to any disclaimer, the term of this patent is extended or adjusted under 35 U.S.C. 154(b) by 0 days.

(21) Appl. No.: 13/175,274

(22) Filed: Jul. 1, 2011

(65) Prior Publication Data
US 2013/0006403 A1 Jan. 3, 2013

(51) Int. Cl.
*A63F 9/24* (2006.01)
*A63F 13/00* (2014.01)
*G06F 17/00* (2006.01)
*G06F 19/00* (2011.01)
*A63F 13/44* (2014.01)
*G06Q 10/10* (2012.01)
*A63F 9/00* (2006.01)

(52) U.S. Cl.
CPC .............. *A63F 13/44* (2014.09); *G06Q 10/101* (2013.01); *A63F 9/0096* (2013.01); *G06Q 10/10* (2013.01)

(58) Field of Classification Search
CPC ......... A63F 13/44; A63F 13/47; A63F 13/40; A63F 13/50
USPC .............................. 705/7.21; 273/429; 463/40
See application file for complete search history.

(56) References Cited

U.S. PATENT DOCUMENTS

| 6,752,396 B2 * | 6/2004 | Smith ........................... 273/429 |
| 2009/0094340 A1 * | 4/2009 | Gillai et al. ................... 709/206 |
| 2011/0112881 A1 * | 5/2011 | Malhotra et al. ............. 705/7.21 |

OTHER PUBLICATIONS

Gina Trapani, "0Boxer Awards Badges, Points for Clearing Away Email", Oct. 2, 2010, <http://web.archive.org/web/20101002000700/http://www.fastcompany.com/1690913/0boxer-turns-email-drudgery-into-gameplay>.*
"Throw an email out. It will come back when you need it!", Mar. 26, 2010, <http://web.archive.org/web/20100326142854/http://www.baydin.com/boomerang/>.*

* cited by examiner

*Primary Examiner* — Milap Shah
*Assistant Examiner* — Jason Pinheiro
(74) *Attorney, Agent, or Firm* — Foley & Lardner LLP

(57) ABSTRACT

The methods and systems described herein provide for effective and efficient completion of tasks by users of a computing device. Specifically, the present invention provides users with a proprietary workflow for timing the completion of a task by a user and scoring a user's ability to complete a task within a predetermined length of time. One exemplary embodiment provides for managing electronic messages by scoring their ability to apply actions to messages. Incentives are provided to users to encourage users to apply actions to messages through positive and negative feedback. Scores determined for any particular user may be determined based on the elapsed time between being provided with a message and applying an action to it, or may be determined based on the contents of a message.

16 Claims, 12 Drawing Sheets

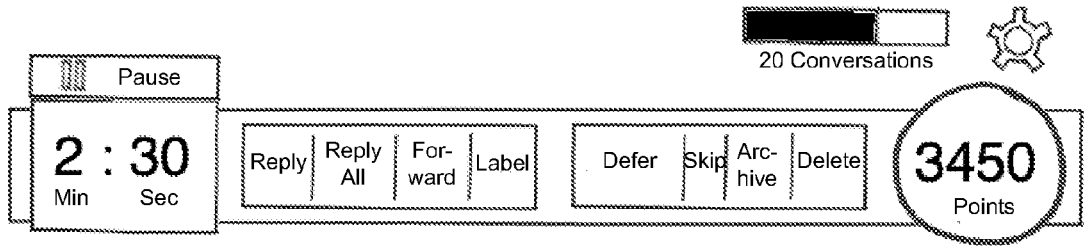

Subject of the email : It could be pretty long and windy.

| Sarah Smith | to me, Roger | | Mar 1 9:30 AM |
|---|---|---|---|
| Roger Darling | to me, Sarah | | Mar 1 11:30 AM |
| Amy Johnson | to me, Sarah | | Mar 1 11:45 AM |

From: Aye Moah (aye@____.com)
To: Amy Johnson (amy@__.com)
 Roger Darling (roger@__.com)
 Sara Smith (ssn@__.com)

Mar 2 9:45 PM

Hello, I'm responding to your e-mail. I thought what you said was very interesting and insightful. I was also impressed with how quickly and efficiently you responded to my earlier e-mail.

I really like corresponding with you all. I hope we can do it more often.

-Aye

Reply   Reply All   Forward

Check for additional messages in this conversation.

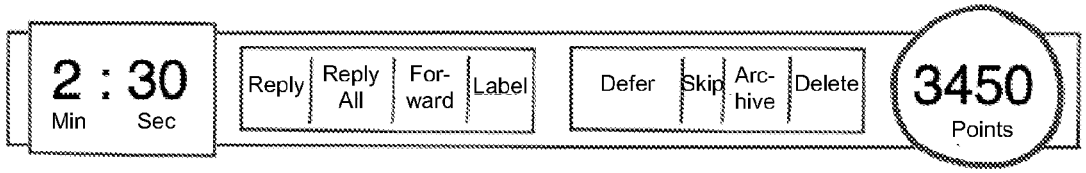

*FIG. 8*

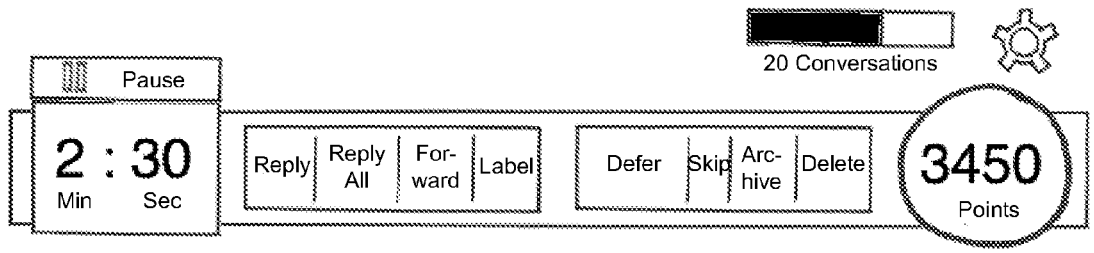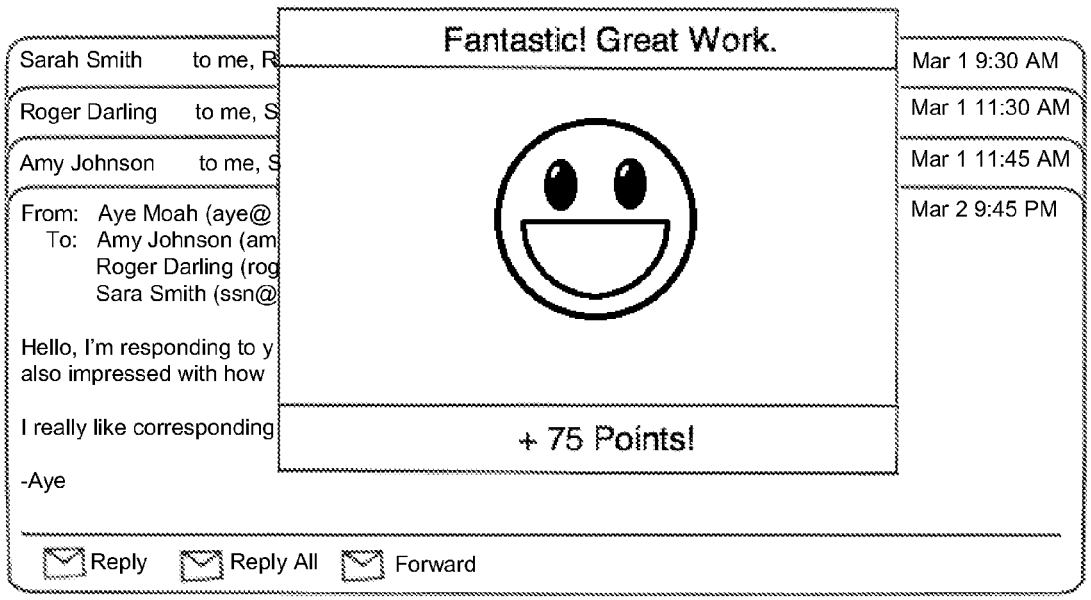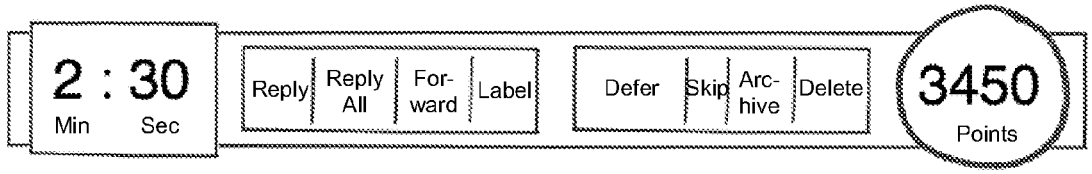
FIG. 9

SYSTEMS AND METHODS FOR APPLYING GAME MECHANICS TO THE COMPLETION OF TASKS BY USERS

BACKGROUND

Users of information technology are increasingly required to accomplish more and more tasks through their computers. Examples of such tasks include, but are not limited to, responding to electronic messages, reviewing documents, drafting documents, sending or responding to communications, or any other typical tasks accomplished by information workers through their computers, mobile phones, or other electronic devices.

The growth in electronic communications allows individuals and businesses to communicate more efficiently and to a degree not previously conceivable by prior communication mediums. E-mail and other forms of electronic messaging have almost completely supplanted telephonic, written, and in-person modes of communication on a day to day basis. The onset of social networking platforms, as well as the mobile web, has further driven the extent to which society relies on communication via electronic messaging. A variety of platforms, software solutions, and service providers exist to facilitate such electronic messaging. Meanwhile, users have sought out ways to organize and manage the completion of other tasks through applications and programs that provide task list management solutions.

In the context of E-mail, numerous providers of E-mail services exist. Most large corporations host their own E-mail servers for managing E-mail. Many online services, such as Hotmail (Microsoft), Gmail (Google), or Yahoo! provide hosted E-mail solutions to individual consumers and businesses.

Conventional methods for interfacing with electronic messaging systems typically involve the use of an inbox where new messages appear. A user opens a window in a program or navigates to a particular website, and is presented with a listing of messages. The user may then open a particular message, delete it, archive it, move it into a different folder or label it in some fashion. Typically, users may read a particular message, and then simply leave the message in their inbox.

While most E-mail programs refer to the default folder or collection for new messages as an "inbox", the concept of an "inbox" can be generalized to situations where a folder is not explicitly labeled as an "inbox". An inbox is simply a collection of electronic messages. The messages may be new messages, unread messages, read messages, or combination of new, unread, or read messages. Some E-mail programs allow users to set "rules" for managing E-mail. These rules can automatically route new messages to different folders or collections without placing the message in the folder or collection labeled by default as the "inbox." In such situations, the folder or collection to which the new message is routed may act as an inbox.

The growth of electronic messaging has introduced novel problems in regards to how best to efficiently and effectively use electronic messaging at a large scale. For example, employees can spend up to three hours a day simply using their E-mail programs, applications, or interfaces to send, reply, or just manage their E-mail.

Conventional methods for effectively managing the growing number of electronic messages accumulating in inboxes include setting "rules" for management and routing of E-mail, automatically deleting E-mails, applying spam filters, refusing E-mail from certain senders, only allowing E-mail from certain senders, labeling certain E-mails as important, dragging E-mails into pre-determined folders, or labeling messages for future reference, action, or for archival purposes. Additionally, some individuals apply different methodological approaches to handling their E-mail in order to maximize efficiency. One such approach is the "inbox zero" methodology, which dictates that users attempt to maintain an inbox without any messages in it. Applying this method, a user immediately acts upon each E-mail in an inbox until all are removed from the inbox. For example, a user may log on to his electronic messaging service provider and discover 5 new messages. Applying the "inbox zero" methodology the user deletes 3 of the messages, replies to one message and then archives it, and drags the last message into a folder which might be labeled "For Follow Up" or something similar for future action. At the end of this session, the user has zero messages in his inbox, and will thus presumably have a small number of new messages awaiting him or her upon next log on. Applying such a methodology reduces the risk that at any particular moment in time the user will suffer from "E-mail overload". E-mail overload comprises a state where the inbox becomes so full with new messages that the user becomes incapable of properly addressing each message. E-mail overload can lead to loss of productivity, unnecessary stress, or missing important information and deadlines.

Conventional methods for effectively managing tasks also do not provide effective incentives for users to complete tasks effectively and efficiently. Typical software solutions that encourage the completion of tasks include various providers of task-list software. This software allows users to set deadlines, list tasks, and schedule reminders. Such solutions include Microsoft Office's "Tasks" feature, Google Inc.'s "Google Tasks" service, and the "Remember the Milk" service available at http://www.rememberthemilk.com. Present solutions however, do not provide for an effective and fun method for enticing the completion of tasks.

SUMMARY

Applicants have appreciated that available technology for creating incentives for users to complete various tasks does not provide users with effective means for quickly and efficiently completing tasks. For example, Microsoft Outlook's "Tasks" feature provides and exemplary existing means for completing tasks. A user may create a new task; label it something such as "Draft Memorandum", "Review Documents", or "Reply to Message"; set a date by which it should be completed; and set outlook calendar reminders to remind them. In some circumstances, a task may turn red when it is overdue, creating an indicator that a user has fallen behind on accomplishing a particular task. Presently available systems or methods do not provide means for timing the completion of tasks by users, enticing users to accomplish those tasks, and scoring a user's performance in regards to how effectively and efficiently users complete tasks according to the time necessary to complete them. Managing electronic messages provides a good example of one embodiment of the present disclosure. In such an embodiment, the task at issue may be the selection of an action to be applied to a message.

Applicants have further appreciated that available technology for managing electronic messages does not provide users with effective means for keeping their inboxes under control. Traditional systems and methods for managing electronic messages are focused on providing users with a plurality of tools for customizing organization of their inboxes. However, no tools provide users with a comprehensive interface for effectively managing messages in a manner which automatically enhances productivity and increases enjoyment, while preventing or recovering from message overload. Additionally, no presently available tools provide users with an interface capable of enforcing a particular workflow or methodology for managing electronic messages. E-mail productivity methodologies such as "inbox zero" lack a technological enforcement mechanism by which users are compelled to clean out their inboxes, rather, the implementation of such methodologies are entirely up to the user. Moreover, such methodologies fail to provide for an enjoyable experience while managing electronic messages.

Applicants have also appreciated that game mechanics which provide users with positive or negative feedback are useful for creating incentives for users to accomplish goals. In the context of managing electronic messages, applicants have discovered that by using game mechanics to create incentives for users to remove messages from an inbox, users can significantly increase productivity while enhancing the enjoyment of managing their inbox.

In accordance with one embodiment of the invention, a computer based user interface is provided to a user for managing electronic messages through the use of game mechanics. The interface provides a message from an inbox to a user. The interface further provides a plurality of actions which may be applied to the message. The interface determines that a user has selected one of said actions. The interface then determines a score for the user based, at least in part, on the time elapsed between displaying the contents of the message and a period of time after selection of the action.

In accordance with a further embodiment of the invention, a method for managing electronic messages through the use of game mechanics is provided. A message from an inbox is provided to a user. A plurality of actions which may be applied to the message are further provided to a user. A determination that a user has selected one of said actions is made. A score for the user is then determined based, at least in part, on the time elapsed between displaying the contents of the message and a period of time after the selection of the action.

In accordance with a further embodiment of the invention, at least one non-transitory computer-readable medium is provided, encoded with a plurality of instructions that, when executed, perform a method for managing electronic messages through the use of game mechanics. The method may comprise: providing a message from an inbox to a user; providing the user with a plurality of actions which may be applied to the message; determining that a user has selected one of said actions; and determining a score for the user based, at least in part, on the time elapsed between displaying the contents of the message and a period of time after the selection of the action.

In accordance with a further embodiment of the invention, a method for managing electronic messages through the use of game mechanics is provided, wherein: A message from an inbox is provided to a user. Information about related messages may also be provided to the user. Related messages and the message may be part of the same conversation. A timer is displayed to a user. The timer may represent the amount of time allocated for a user to select a particular action. The capability of pausing the time may be provided to the user. A plurality of actions which may be applied to the message are provided to the user. A determination is made that a user has selected one of said actions. The user may have selected an action from the group consisting of "Reply", "Reply All", "Forward", "Label", "Defer", "Archive", "Delete", or "Skip". A score is determined for the user based, at least in part, on the time elapsed between displaying the contents of the message and a period of time after selection of the action. The score may be determined based, at least in part, on the contents of the message. The score may be determined based, at least in part, on the action selected by the user. The score may be determined based, at least in part, on a measure of the complexity of the message. A representation of how many messages remain in either a predetermined subset of the inbox or the entire inbox is provided to the user. Positive feedback is provided to the user at a point in time after the selection of an action by the user. The positive feedback may comprise an image, series of images, a positive statement, video, or audio. Upon completion of the selected action, the message is removed from the inbox. A new message from the inbox, or from a predetermined subset of the inbox, is provided to the user, if one exists.

In accordance with a further embodiment of the invention, a method for managing electronic messages through the use of game mechanics wherein negative feedback in response to the total elapsed time from providing a message to the user and a time before a user selects an action is provided to the user. The negative feedback may comprise an image, a change in display color, flashing colors, flashing text, audio, video, a statement, a pop-up window, or displaying a negative score.

In accordance with a further embodiment of the invention, a method for dynamically updating a timer which may be incorporated into a method for managing electronic messages through the use of game mechanics is provided. A message from an inbox of a user is received. A measure of the complexity of the contents of the message is determined. An appropriate length of time for a user to select an action to be applied to the message is determined. The appropriate length of time may be determined based, at least in part, on the measure of complexity. A timer displayed to the user is updated with the determined appropriate length of time.

In accordance with a further embodiment of the invention, a method for deferring a message which may be incorporated into a method for managing electronic messages through the use of game mechanics is provided. A determination is made that a user has selected an action to defer a message. The contents of the message are evaluated. A suggested time at which to return the message to the inbox is determined. The suggested time may be determined based, at least in part, on the contents of the message. The suggested time is suggested to the user. The selection of a selected time at which to return the message to the inbox is received. The message is removed from the inbox. The message is stored at a location until the selected time. The message is returned to the inbox at the selected time.

In accordance with one embodiment of the invention, a method for timing the completion of tasks by users is provided. An appropriate length of time for a user to complete a task is determined. A timer with the determined time is displayed to a user. The timer is updated to reflect the passage of time. A determination is made that a user has completed the task. A score for the user is determined based, at least in part, on the passage of time. A score for the user may also be determined based, at least in part, on the time remaining on the timer. The task may be a task stored by a task list program. The task may be a task stored by a task list service provider. The task may be a task that is not stored by either a task list program or task list storage provider.

Throughout this disclosure, reference may be made to E-mail as an exemplary form of electronic message to which the inventions of the present disclosure may be applied. However, it is understood by one having ordinary skill in the art that the present disclosure could be easily adapted to any form of electronic message. Other possible electronic messages to which the invention of the present disclosure may be applied include proprietary messaging platforms, such as those provided by social networking platforms. Examples of such electronic messaging platforms include the "Messages" component of Facebook, the "InMail" component of LinkedIn, the "Direct Message" component of Twitter, as well as other proprietary messaging formats. The invention of the present disclosure may also be applied to text messaging technologies, such as SMS.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIG. 8 is an exemplary user interface for providing methods of managing electronic messages to users, according to one embodiment of the present disclosure.

FIG. 9 is an exemplary user interface for providing methods of managing electronic messages to users incorporating positive feedback, according to one embodiment of the present disclosure.

DETAILED DESCRIPTION

Figure 1A:
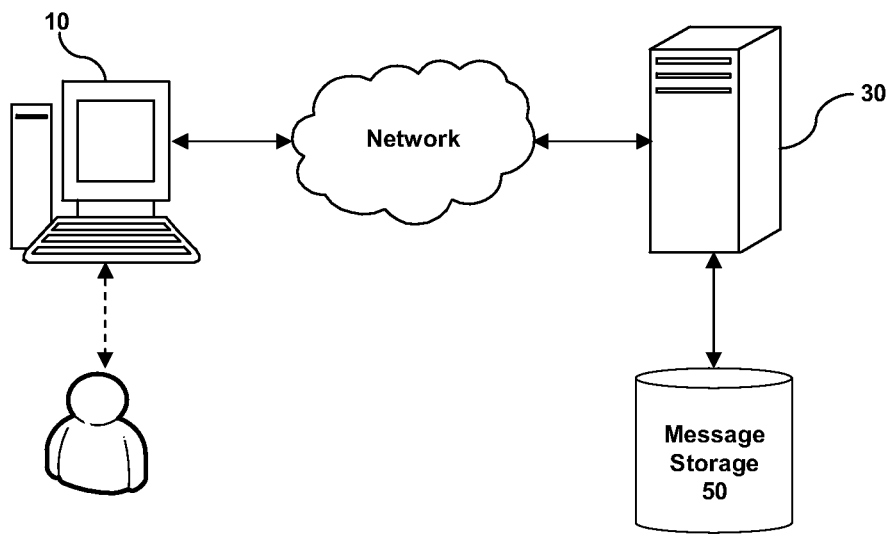
FIG. 1A is a block diagram of a system for managing electronic messages, according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

In reference now to FIG. 1A, a system for providing management of electronic messages through game mechanics is shown. Local machine 10 may access a server 30 which may provide electronic message services to a user. Local machine 10 may be a desktop computer, a server, a laptop, a tablet computer, a smart phone, or any other computing device capable of running a user interface. The server 30 may be a single server, a plurality of servers, a server farm, or an of computing services provided by a cloud based provider of computer services. Such a plurality of servers need not be located at the same location. In some embodiments, server 30 may be a plurality of servers operated by a plurality of different parties, entities, and service providers. The server 30 may be an electronic message server through which a user of local machine 10 may access electronic messages. Electronic messages may be stored in message storage 50. The Network depicted in FIG. 1A may be a local area network (LAN), wide area network (WAN), some other form of public or private network, or the Internet.

In some embodiments, message storage 50 may be located at local machine 10 rather than at a server. In some embodiments, message storage 50 may be distributed across local machine 10 and server 30. In some embodiments, message storage 50 may be replicated across a plurality of local machines 10 and servers 30.

In some embodiments, server 30 may be an E-mail server. In some embodiments, server 30 may be running Microsoft Exchange E-mail server software. In other embodiments, server 30 may be part of a hosted E-mail provider, such as the Gmail service presently provided by Google, Inc., the Hotmail service presently offered by Microsoft, or numerous other similar online services for providing users with access to electronic messages.

In some embodiments, server 30 may be providing a user with a proprietary electronic messaging platform. For example, server 30 may be providing a user with the "Messages" feature offered by Facebook, Inc; the "InMail" feature provided by LinkedIn, or the "Direct Message" feature provided by Twitter. Numerous other proprietary messaging platforms are contemplated within the present disclosure.

In some embodiments, server 30 may be providing a user with access to voicemail services. In some embodiments, server 30 may be providing a user with electronically recorded audio voicemails. In some embodiments, server 30 may be providing a user with access transcribed voicemails. In some embodiments, server 30 may be providing a user with access to text messages, such as those utilizing the SMS protocol, or any other text message protocol.

The systems an methods of the present disclosure may be performed entirely at local machine 10, entirely at server 30, or on some combination of local machine 10 and server 30. In some embodiments, all the services that may be provided by server 30 may be provided by local machine 10, or a combination of local machine 10 and server 30. In some embodiments, all the service that may be provided by local machine 10 may be provided by server 30, or a combination of local machine 10 and server 30.

In some embodiments of the present disclosure, electronic messages stored at message 30 may be organized into different folders, labels, categorizations, collections, or any other manner of categorizing and organizing electronic messages. By default, most electronic messaging solutions provide that new messages are received and stored on behalf of the user at a particular folder, label, category, collection, or any other identifier for categorizing and organizing electronic messages. In the context of E-mail, most E-mail solutions provide that this default folder, label, category, collection, or any other identifier for categorizing and organizing electronic messages is identified as an "inbox." Users of E-mail generally check their inbox for new messages and then reply, forward, delete, or archive their messages accordingly.

The concept of an inbox is generally applicable to all electronic messaging platforms beyond E-mail, and can be generalized as any folder, label, category, collection or any other identifier for categorizing and organizing electronic messages. For example, many users of E-mail utilize a "For Follow Up" folder to which they move E-mails to from the default "Inbox". The user generally intends to follow up on these E-mails or perform some action on them at a later time. It would be understood by those skilled in the art that in such a situation, the "For Follow Up" folder may be a relevant inbox for the purposes of practicing the present disclosure, in addition to the default "Inbox" provided by the electronic messaging service. In some embodiments of the present disclosure, the default folder, label, category, collection, or other identifier for categorizing and organizing electronic messages in to which new messages are placed may not be labeled as an "Inbox".

Figure 1B:
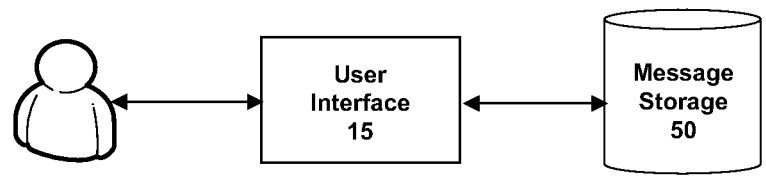
FIG. 1B is a block diagram of a system for providing a user interface to a user for managing electronic messages, according to one embodiment of the present disclosure.

In reference now to FIG. 1B, a block diagram of an embodiment of a system for providing management of electronic messages through the use of game mechanics is depicted. A user interface 15 is provided to the user for performing the invention of the present disclosure. The user interface 15 is in communication with message storage 50. The user interface 15 and message storage 50 may be located on the same machine or on different machines. The user interface 15 may operate on local machine 10, server 30, or a combination of local machine 10 and server 30. The user interface 15 and message storage 50 may be in communication over a network. Electronic messages my be organized into folders, labels, categories, collections or by any other means for categorizing and organizing electronic messages at the user interface 15, at message storage 50, at server 30, or any one or combination of these. In some embodiments, user interface 15 may operate as a third-party intermediary between the user and his or her electronic message provider. In such embodiments, the user interface 15 may operate on a third party server 30, the electronic message service provider's servers 30, on local machine 10, or a combination of all of these.

Figure 2:
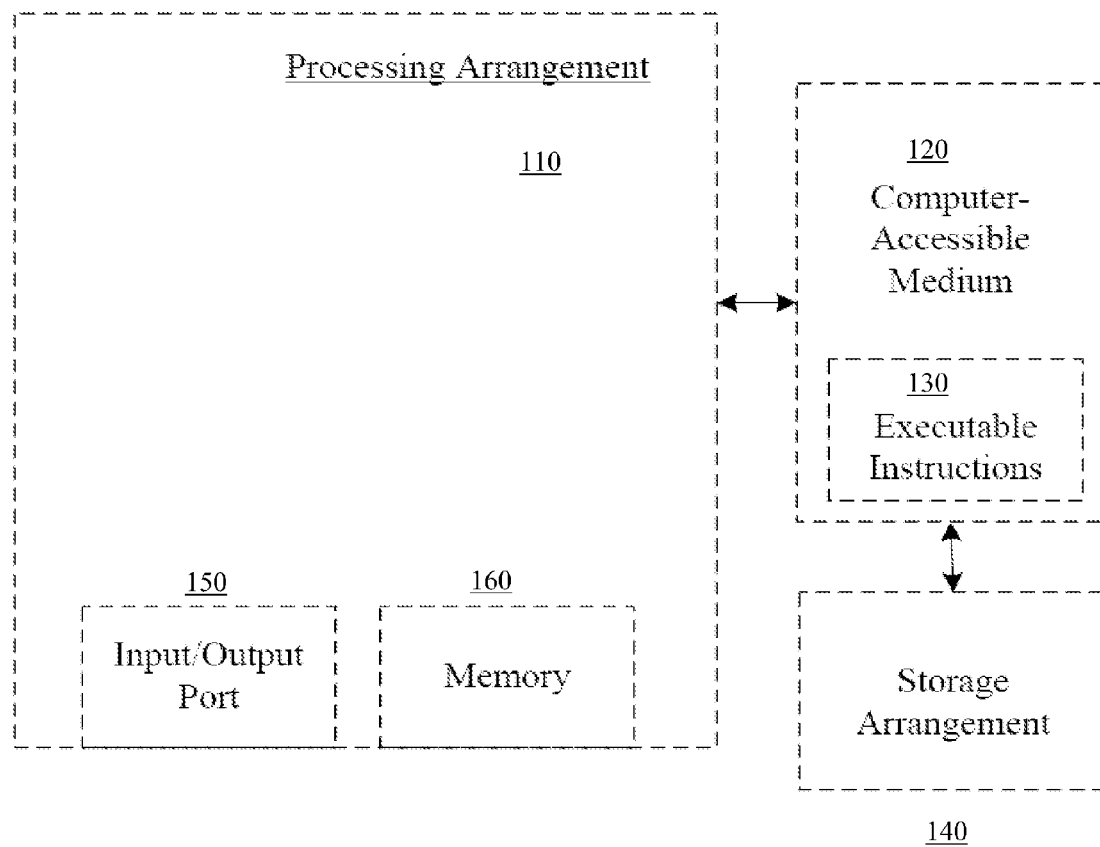
FIG. 2 is a block diagram of an exemplary embodiment of a system 100 according to the present disclosure for executing computer executable instructions performed by processing arrangement 110 and/or a computing arrangement 110, according to one embodiment of the present disclosure.

In reference now to FIG. 2, a block diagram of an exemplary embodiment of a system capable of implementing the present disclosure is shown. For example, an exemplary procedure in accordance with the present disclosure can be performed by a processing arrangement 110 and/or a computing arrangement 110. Such processing/computing arrangement 110 can be, e.g., entirely or a part of, or include, but not be limited to, a computer/processor that can include, e.g., one or more microprocessors, and use instructions stored on a computer-accessible medium (e.g., RAM, ROM, hard drive, or other storage device).

As shown in FIG. 2 a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

Figure 3:
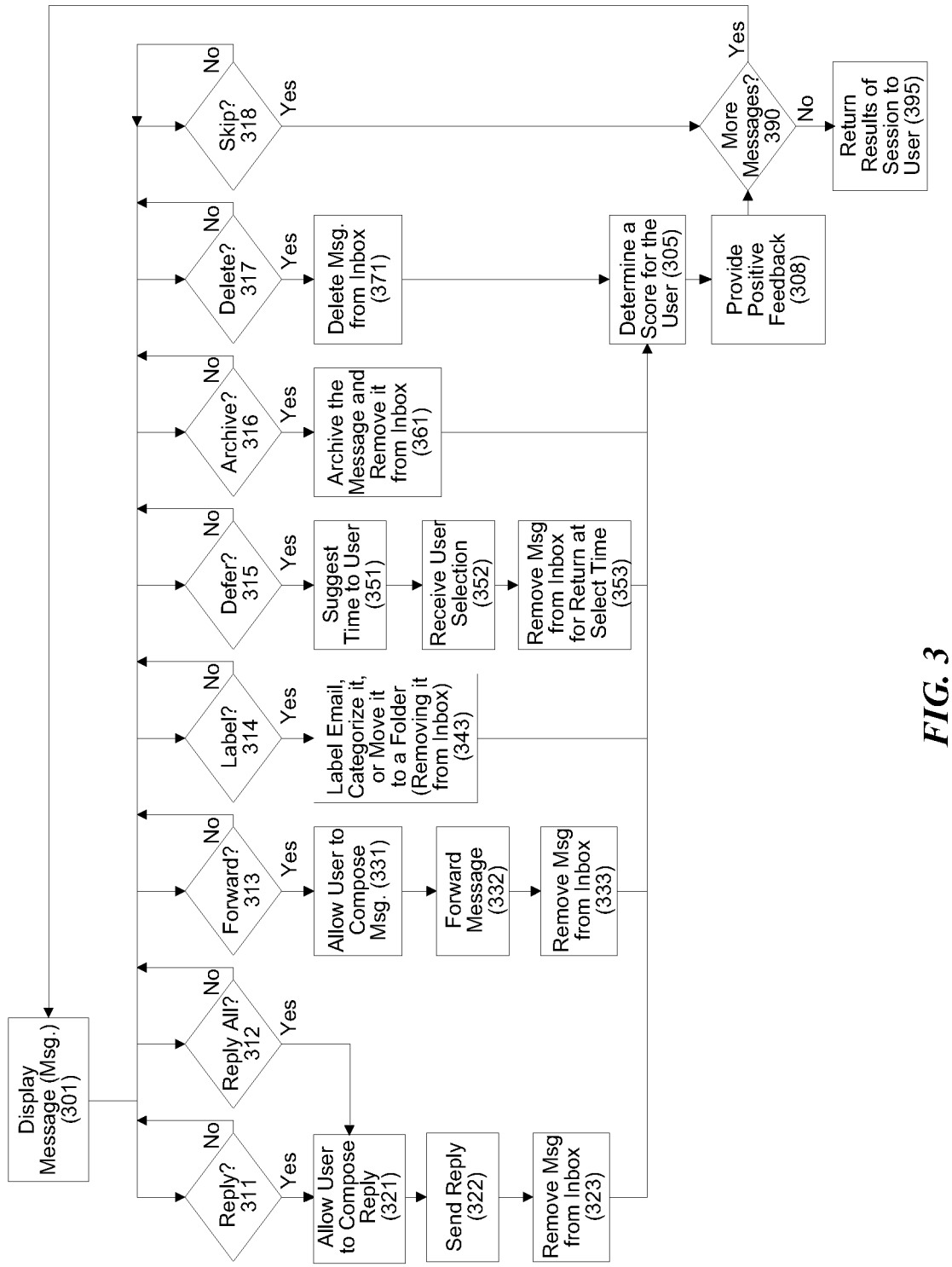
FIG. 3 is a flow diagram of a method for managing electronic messages using game mechanics, according to one embodiment of the present disclosure.

In reference now to FIG. 3, an embodiment of a method for managing electronic messages through the use of game mechanics is depicted. A message from an inbox is provided to a user by displaying the message to the user 301. The user is provided with a plurality of actions that may be applied to the message. These actions may include the actions of Reply 311, Reply All 312, Forward 313, Label 314, Defer 315, Archive 316, Delete 317, or Skip 318. The user may then select one of said actions to be applied to an E-mail. Other possible actions not explicitly included are further contemplated by the present disclosure. Any method or process which may be applied to a message is a possible action which the user may select. The concept of labeling 314 a message may alternatively be referred to as categorizing or moving a message. Such labeling, categorizing, or moving may take the message out of the relevant inbox by removing an association of the relevant inbox with the message and adding an association with some other folder, label, category, collection or any other identifier for categorizing and organizing electronic messages. The concept of archiving 316 a message may be a subset of the labeling 314 action.

In further reference to FIG. 3, if the user selects to reply 311 or reply all 312 to the message, the user is provided an opportunity to compose 321 a reply message. Once the user finishes composing a reply message, the message may be sent 322. The original message may then be removed from the relevant inbox 323. In some embodiments, a reply message may be sent 322 after the message is removed from the inbox 323. In some embodiments a score may be calculated 305 at any time after the selection of an action by a user. This includes immediately after selection, after allowing a user to compose a reply 321, after sending 322 the reply, or after removing the message from the inbox 323.

In further reference to FIG. 3, if the user selects to forward 313 the message, the user is provided an opportunity to compose 331 a message to accompany the forwarded message. In some embodiments, the message is then forwarded 332. In some embodiments, the original message is then removed from the relevant inbox 333. In some embodiments a score may be calculated 305 at any time after the selection of an action by a user. This includes immediately after selection, after allowing a user to compose a message 331, after sending 332 the reply, or after removing the message from the inbox 333.

In further reference to FIG. 3, if the user selects to label 314 the message, the user is provided an opportunity to change the association of the message from that of the relevant inbox. The user may indicate a new association for the message based upon any means for organizing and categorizing electronic messages. Including moving the message to a different folder, assigning a new or different label for the message, assigning a new or different category for the message, putting the message in a new or different collection, or utilizing and other new or different identifier for the message utilizing any other means for categorizing or organizing messages. In some embodiments, such labeling 314 may immediately remove the message from the relevant inbox. In other embodiments, an additional step of removing the message from the mailbox after labeling 314 may be required.

In further reference to FIG. 3, if the user selects to defer 315 the message, the user is provided with an opportunity to defer the message. Deferring 315 the message may refer to any means for delaying future action on the message by the user. One embodiment of deferring a message is the "Boomerang" feature offered Baydin, Inc. of Mountain View, Calif. In some embodiments, after the selection of an action to defer 315 the message by a user, a suggested time at which to return the message to the relevant inbox is suggested 351 to the user. In some embodiments, a user is then requested to select a time at which to return the message to the relevant inbox. In some embodiments, the selection of a time at which to return the message to the relevant inbox by the user is received 352. In some embodiments, the message is removed 353 from the inbox for return at the selected time. In some embodiments, the message may be removed 353 from the inbox at any time after the selection of an action by a user. In some embodiments, the message may be removed 353 from the inbox after suggesting a time to the user. In some embodiments, a score may be determined 305 for a user at any time after the selection of an action by a user.

In further reference to FIG. 3, if the user selects to archive 316 the message, the message may be archived. In some embodiments, archiving a message may change an identifier associated with the message to a particular folder, label, category, collection, or other identifier for a means to categorize or organize messages used for archival purposes. In some embodiments, archiving a message may automatically remove it from the relevant inbox. In other embodiments, removing the message from an inbox may require an additional step.

In further reference to FIG. 3, if the user select to delete 317 the message, the message may be deleted and thus removed from the relevant inbox. If the user selects to skip 318 the message, nothing is done with the message.

In further reference to FIG. 3, at some time after the selection of an action by a user, a score for the user is determined 305. The score may be determined 305 based, at least in part, on the time elapsed between displaying the contents of the message and a period of time after selection of the action. In some embodiments of the present disclosure, a user may obtain a higher score by spending less time between the display of the message and selection of an action. In some embodiments, the user may obtain a bad score by spending too much time between display of the message and selection of an action. In some embodiments, the score may be determined 305 base, at least in part, on a timer. In some embodiments, the time may be set according to a predetermined length of time for a user to select and action. In some embodiments a user may be able to pause the timer. In some embodiments, the timer may be paused automatically in response to a determination that a user needs more time. In some embodiments, the timer maybe paused in response to a determination that a user has started to perform some other task. In some embodiments the score may be determined 305 based, at least in part, on whether the user paused the timer. In some embodiments, time may be added to the timer in response to a user's selection of an action which may require the user to spend additional time completing the action. Such embodiments include embodiments where a user may have selected the action of Reply, Reply All, or Forward. Additional embodiments encompassing actions where a user may require additional time to compose a message or perform some other task in order to complete the action are contemplated by the present disclosure. A score may be determined 305 based, at least in part, on additional time added to a timer. In some embodiments, a score may be determined 305 based, at least in part, on which action a user selected.

In further reference to FIG. 3, positive feedback may be provided 308 to a user at any time after the selection of an action by a user. In some embodiments, the positive feedback may comprise the score determined 305 for the user. In some embodiments, the positive feedback may be provided before the determination 305 of a score. In some embodiments, positive feedback may be provided more than once for a given message. In some embodiments, the positive feedback may include a statement, image, video, audio, slideshow, score, animation, or any one or combination of these.

In some embodiments, negative feedback may be provided to a user based, at least in part, on the determination 305 of a score for the user. In some embodiments, negative feedback may be provided based on a user's selection to skip a message.

In further reference to FIG. 3, a determination 390 is made as to whether more message remain in a predetermined subset of the relevant inbox. In some embodiment, the predetermined subset of the relevant inbox may comprise the entirety of the relevant inbox. In some embodiments, the predetermined subset of the relevant inbox may comprise a given number of messages initially selected form the relevant inbox for the application of the systems and methods of the present disclosure. If more messages remain, then the next message is displayed 301 to the user.

In further reference to FIG. 3, if a determination 390 that no more messages remain, results of the current session may be returned to the user. These results may include an overall total score for the session, an overall all-time score for repeated use of the systems and methods of the present disclosure, and positive or negative feedback. In some embodiments, the results may include metrics for use of the systems and methods of the present disclosure. In some embodiments, the results may include a graph charting a user's improved use of the systems and methods described in the present disclosure.

In some embodiments of FIG. 3, a user may pause a timer at any point in the flow. In some embodiments, pausing a timer may have no effect on determining 305 a score for the user. In other embodiments, pausing a timer may have an effect on determining 305 a score for a user. In some embodiments, pausing a timer may have no effect on providing 308 positive feedback to a user. In other embodiments, pausing a timer may have an effect on providing 308 positive feedback to a user.

In some embodiments of FIG. 3, a user may be provided with the option of performing an action on a plurality of messages at once. For example, a user may be able to archive, forward, or delete a plurality of messages at once. In some embodiments, a plurality of messages to which to apply a particular action is determined. In some embodiments, a plurality of messages to which to apply a particular action is determined automatically. In some embodiments, a plurality of messages to which to apply a particular action is determined according to the contents of those messages. In some embodiments, a plurality of messages to which to apply a particular action is determined according to the sender and/or recipients of the messages. In some embodiments, a plurality of messages to which to apply a particular action is determined based, at least in part, on a user's prior selection of an action to apply to a message. In some embodiments, a plurality of messages to which to apply a particular action is determined based, at least in part, on a user's prior selection of actions to apply to a prior messages.

Figure 4A:
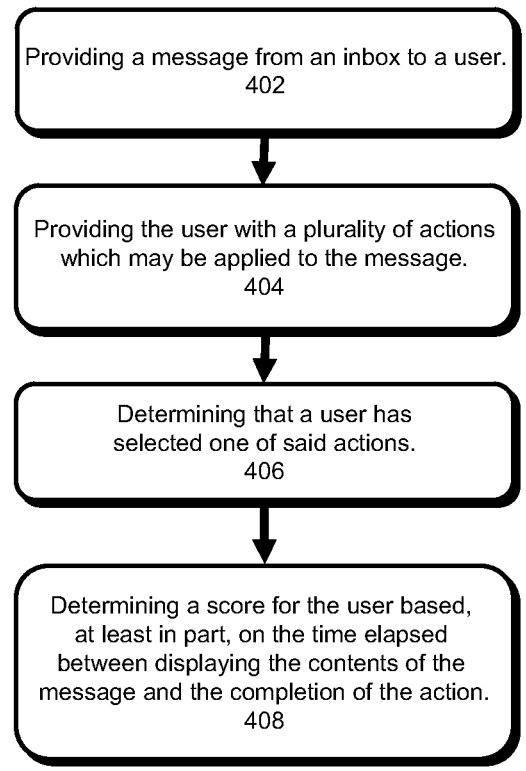
FIGS. 4A-4B are flow diagrams of methods for managing electronic messages using game mechanics, according to one embodiment of the present disclosure.

In reference now to FIG. 4A, a method for managing electronic messages through the use of game mechanics is depicted. A message from an inbox is provided 402 to a user. The user is provided 404 with a plurality of actions which may be applied to the message. In some embodiments, the user is provided with a suggested action to perform. In some embodiments, the suggested action may be determined based, at least in part, on the content of the message. A determination 406 is made that a user has selected one of said actions. A score is determined 408 for the user based, at least in part, on the time elapsed between displaying the contents of the message and the completion of the action.

The concept of a score which may be determined for a user may be generalized as any indicator of progress. In some embodiments, the determined score may be selected from a group of possible score options. In some embodiments, the determined score may be a numerical score. In some embodiments, such a score may be referred to as points. In some embodiments, the determined score may be a statement. In some embodiments, a score may be determined based on a numerical calculation. In some embodiments, a score may be determined based, at least in part, on a plurality of settings which have previously been selected by the user. In some embodiments where a score is numerical, the score may be either positive or negative. In some embodiments, a score may be selected from the group consisting of "Good", "Very Good", "Bad", "Great", "Perfect", "Horrible", "Poor", or "You're Embarrassing Yourself".

Figure 4B:
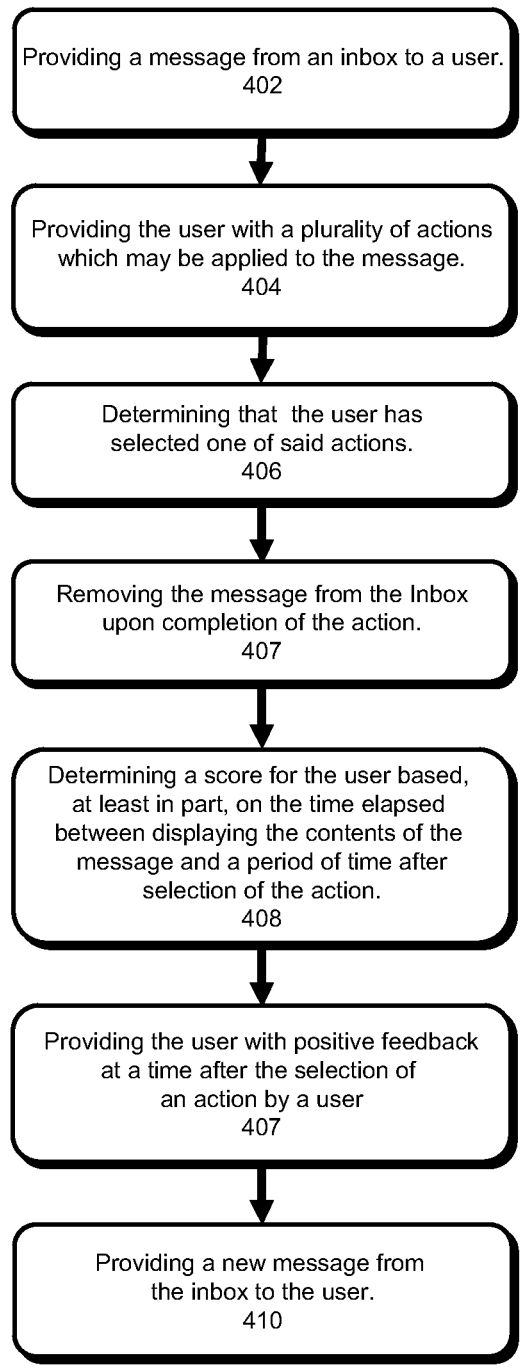

In reference now to FIG. 4B, a method for managing electronic messages through the use of game mechanics is depicted. A message from an inbox is provided 402 to a user. A plurality of actions which may be applied to the message are provided 404 to the user. A determination 406 is made that the user has selected one of said actions. The message from the inbox is removed 407 upon completion of the action. A score is determined 408 based, at least in part, on the time elapsed between displaying the contents of the message and a period of time after selection of the action. The user is provided 409 with positive feedback at a time after the selection of an action by a user. A new message from the inbox is provided to the user 410.

Figure 5A:
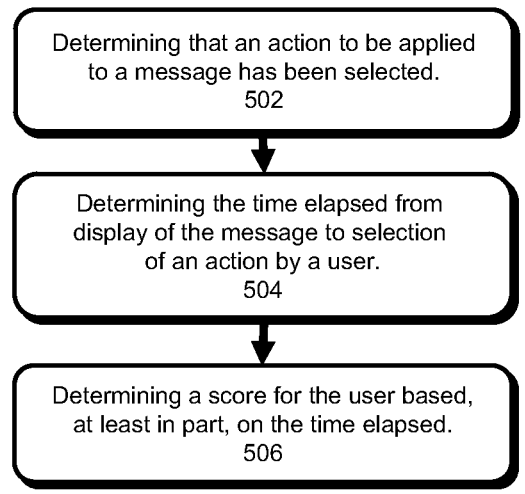
FIGS. 5A-5B are flow diagrams of methods for determining scores for users which may be incorporated into methods for managing electronic messages using game mechanics, according to one embodiment of the present disclosure.

In reference now to FIG. 5A, a method for determining a score which may be incorporated into a method for managing electronic messages through the use of game mechanics is depicted. A determination 502 is made that an action to be applied to a message has been selected by a user. The time elapsed from display of the message to selection of an action by a user is determined 504. A score for the user based, at least in part, on the time elapsed is determined 506.

Figure 5B:
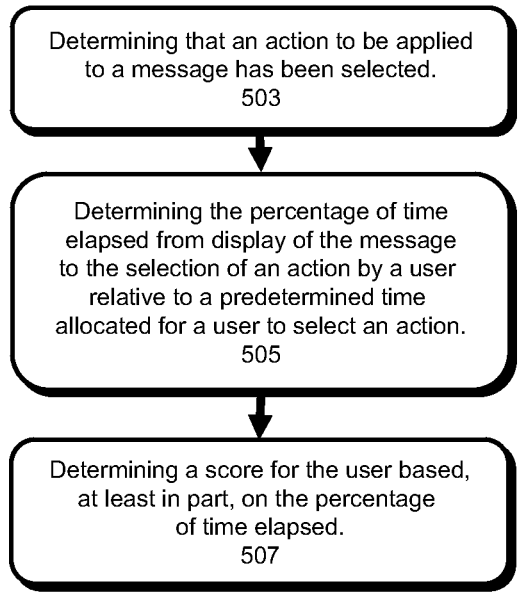

In reference now to FIG. 5B, a method for determining a score which may be incorporated into a method for managing electronic messages through the use of game mechanics is depicted. A determination 503 is made that an action to be applied to a message has been selected by a user. The percentage of time elapsed from display of the message to the selection of an action by a user relative to a predetermined time allocated for a user to select an action is determined 505. A score for the user based, at least in part, on the percentage of time elapsed is determined. In some embodiments, the predetermined time allocated for a user to select an action may be represented by a timer displayed to a user. In some embodiments, the predetermined time allocated for a user to select an action may not be displayed to a user. In some embodiments the predetermined time allocated for a user to select an action may be determined based on the contents of the message. In some embodiments, the predetermined time allocated for a user to select an action may be determined based on a measure of complexity of the message. In some embodiments, the predetermined time allocated for a user to select an action may change. In some embodiments, the predetermined time allocated for a user to select an action may change in response to selection of a particular action by a user. In some embodiments, the predetermined time allocated for a user to select an action may be added to if a user selects an action requiring the completion of additional tasks by the user. In some embodiments, the predetermined time allocated for a user to select an action may be added to if a user selects to reply, reply all, forward, or label a message.

Figure 6:
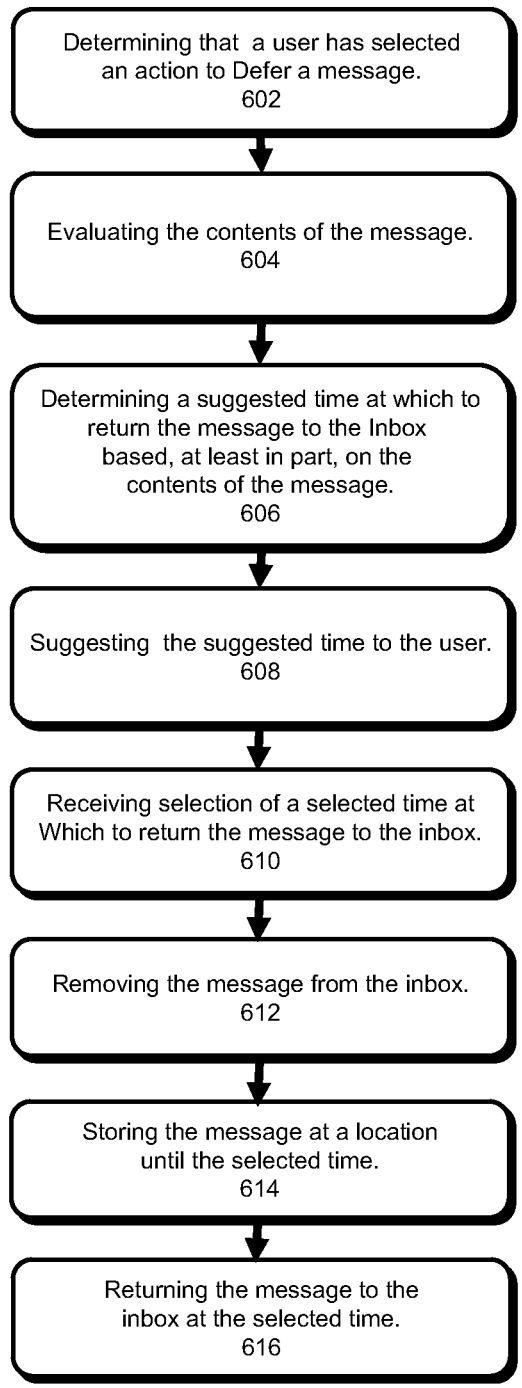
FIG. 6 is a flow diagram of a method for deferring a message which may be incorporated into a methods for managing electronic messages using game mechanics, according to one embodiment of the present disclosure.

In reference now to FIG. 6, a method for deferring a message which may be incorporated into a method for managing electronic messages through the use of electronic messages is depicted. A determination 602 is made that a user has selected an action to defer a message. The contents of the message are evaluated 604. A suggested time at which to return the message to the inbox based, at least in part, on the contents of the message is determined 606. The suggested time is suggested 608 to the user. The selection of a selected time at which to return the message to the inbox is received 610. The message is removed 612 from the inbox. The message is stored 614 at a location other than the relevant inbox until the selected time. The message is returned 616 to the relevant inbox at the selected time.

In some embodiments, the sender of a message may be evaluated 604. In some embodiments, the recipients of a message may be evaluated. In some embodiments, the evaluation 608 is accomplished by searching the contents of the message for keywords. In some embodiments, the evaluation 608 is accomplished through the use of pattern recognition. In some embodiments, the evaluation 608 is accomplished through linguistic analysis. In some embodiments, the evaluation 608 is accomplished through the application of a proprietary algorithm. In some embodiments, the suggested time at which to return the contents of the message to the inbox may be determined 606 based on any item evaluated 608.

Figure 7A:
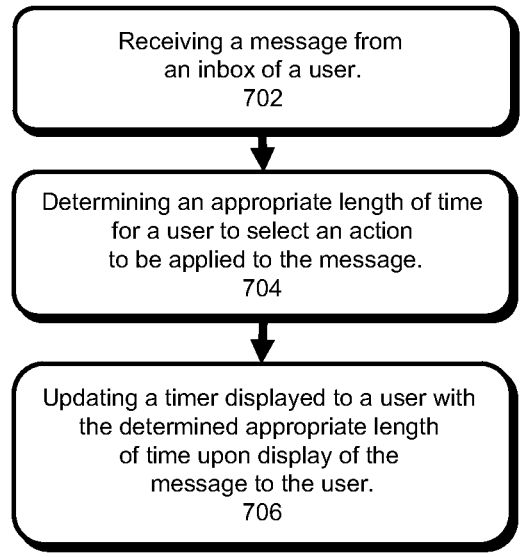
FIG. 7A-7C are flow diagrams of methods for updating a timer which may be incorporated into a methods for managing electronic messages using game mechanics, according to one embodiment of the present disclosure.

In reference now to FIG. 7A, a method for updating a timer which may be incorporated into a methods for managing electronic messages using game mechanics is depicted. A message from an inbox of a user is received 702. An appropriate length of time for a user to select an action to be applied to the message is determined 704. A timer displayed to a user with the determined appropriate length of time is displayed 706 to the user upon display, or in conjunction with, the display of the message to the user.

Figure 7B:
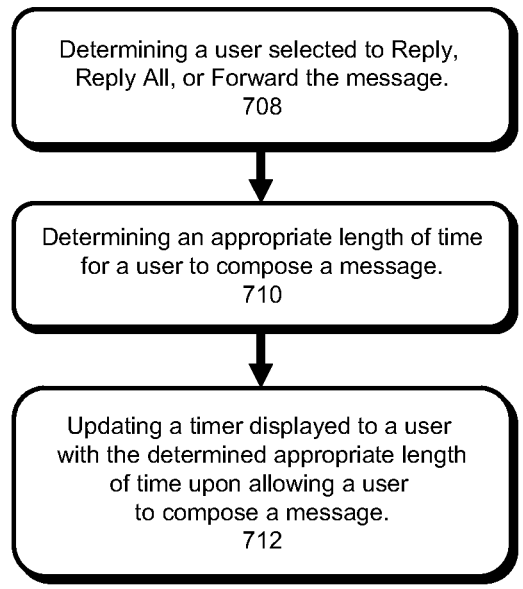

In reference now to FIG. 7B, a method of a method for updating a timer which may be incorporated into a methods for managing electronic messages using game mechanics is depicted. A determination 708 is made that a user selected a particular action requiring that a user accomplish additional tasks in order to complete the action. In some embodiments, such a selection may be one to reply, reply all, forward, or label the message. An appropriate length of time for a user to complete the tasks required to complete the action is determined 710. In some embodiments, an appropriate length of time for a user to compose a message is determined 710. A timer displayed to a user is updated 712 with the determined appropriate length of time to accomplish the tasks. In some embodiments, a timer displayed to a user is updated 712 with the determined appropriate length of time upon allowing a user to compose a message.

Figure 7C:
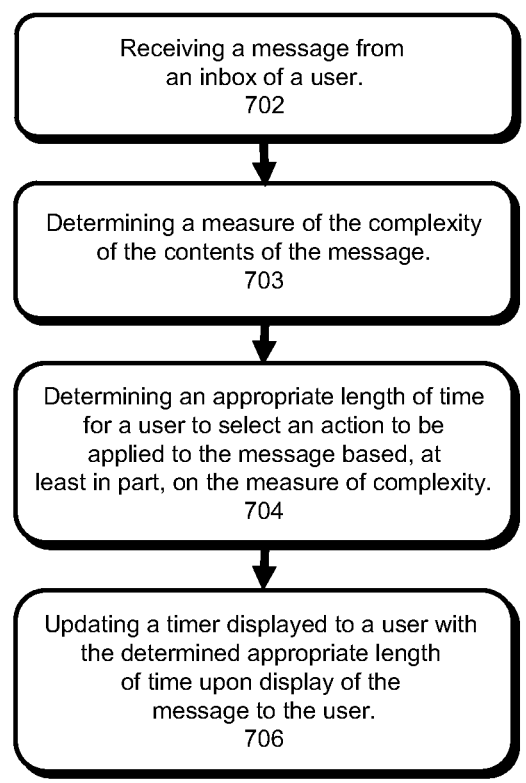

In reference now to FIG. 7C, a method for updating a timer which may be incorporated into a methods for managing electronic messages using game mechanics is depicted. A message from an inbox of a user is received 702. A measure of the complexity of the contents of the message is determined 703. An appropriate length of time for a user to select an action to be applied to the message based, at least in part, on the measure of complexity is determined 704. A timer displayed to a user is updated 706 with the determined appropriate length of time upon display of the message to the user.

In some embodiments, a measure of complexity may be determined 703 by evaluating the contents of the message. In some embodiments, a measure of complexity may be determined by applying a proprietary algorithm to the contents of the message. In some embodiments, a measure of complexity may be determined 703 by conducting a keyword search on the contents of the message. In some embodiments, a measure of complexity may be determined 703 based, at least in part, on the length of the message. In some embodiments, a measure of complexity may be determined 703 based solely on the length of the message. In some embodiments, a measure of complexity may be determined based, at least in part, on the sender or recipients of the message. In some embodiments, the measure of complexity may be a numerical value. in other embodiments, the measure of complexity may be a string or other statement. In some embodiments, the measure of complexity may be selected from a predetermined group of a plurality of predetermined measures of complexity. In some embodiments, the measure of complexity may be selected from the group of "Low", "Moderate", "High".

In reference now to FIG. 8, a screen capture of an exemplary user interface 15 for performing the systems and methods of the present disclosure is depicted. A timer is displayed in the upper left hand corner of the interface representing the minutes and seconds for an determined 704 appropriate amount of time for a user to select and action. A pause button for pausing the timer is located directly above the timer. The gear icon in the upper right hand corner of the interface represents a method for a user to access a settings page where the user may set various personalized settings for utilizing the user interface in performing the systems and methods of the present disclosure. The shaded bar directly to the left of the gear demonstrates that "20 conversations" remain in the predetermined subset of a relevant inbox on which the systems and methods described herein are being performed. In some embodiments, the shaded bar may demonstrate the total number of messages remaining in the inbox, rather than a subset. In some embodiments, the shaded bay may demonstrate the total number of messages remaining in the inbox excluding those that have already been displayed to the user during a particular session of utilizing the user interface depicted for performing the systems and methods of the present disclosure.

In further reference to FIG. 8, a circle in the upper right hand corner of the interface displays the terms "3450" and "points" to a user. This display represents a user's total score obtained by performing the systems and methods of the present disclosure. In some embodiments, the total score may be representative of a total score for a particular session of using the user interface. In some embodiments, the total score may be a representative of a total all-time score comprised of the sums of scores for every session the user has utilized the user interface. In some embodiments, the total score may be representative of the sums of total score for a subset of sessions that the user has utilized the user interface. In some embodiments, the display of a total score may be updated while a user utilizes the user interface.

In further reference to FIG. 8, a plurality of actions which may be applied to a message are displayed both across the top of the interface and across the bottom. In some embodiments, the plurality of actions to be applied to a message maybe displayed only once. In some embodiments, the plurality actions may be displayed on one or both sides of the interface. In some embodiments, the plurality of actions may be displayed on the messages themselves. For example, the actions of reply, reply all, and forward are further displayed to the user on the window of the message. In some embodiments, the plurality of actions may be displayed in a manner such that the actions are displayed in a manner that groups certain actions. For example, at the top of the user interface of FIG. 8, reply all, forward, and label are grouped together while defer, skip, archive, and delete are grouped together.

In further reference to FIG. 8, a message is displayed in the center of the interface. The contents of the message may comprise a subject, sender, recipients, meta data, a body, or any other form of information associated with a message. In some embodiments, the message displayed may be an E-mail. In the embodiment of FIG. 8, an E-mail message from Aye Moah to numerous recipients is displayed. Information from three related messages is also displayed. These four messages may be said to comprise a conversation. A conversation may be generally understood as any collection of related messages. For example, a conversation may be comprised of an original message followed by sequential reply messages between the correspondents. In such an embodiment, the conversation may also be referred to as an E-mail chain. Information about the time and date a message was sent may also be displayed, as shown in FIG. 8. In some embodiments, a single message may be associated with a large number of related messages. In such embodiments, the user interface may initially provide the user with only a subset of information about related messages. In such embodiments, an option may be provided to a user for displaying all related messages. In such embodiments, a user may select the option for displaying information from related messages and information from related messages will be displayed.

In further reference to FIG. 8, a user may click on information displayed from related messages, and the entirety of those related messages may be displayed. In some embodiments, a user may display the entirety of a related message by clicking on an icon representative of expanding or collapsing a message. In FIG. 8, such an icon is represented by and upwards or downwards pointing triangle. In some embodiments, an upwards pointing triangle represents collapsing, or limiting the view of the message. In some embodiments, a downwards facing triangle represents expanding the message, or allowing the display if more information. In some embodiments, the timer may be updated in response to a determination that a user has clicked on information displayed from related messages. In some embodiments, the timer may be updated in response to a determination that additional related messages have been displayed to a user.

In reference now to FIG. 9, a screen capture of an exemplary user interface 15 for performing the systems and methods of the present disclosure is depicted. In some embodiments, the user interface may display positive feedback by displaying a statement. in some embodiments, the user interface may display positive feedback by displaying an image. In some embodiments, the user interface may display positive feedback by displaying a score. in some embodiments, the score may be responsive to a user's selection of a particular action. The positive feedback depicted in FIG. 9 may be displayed at any time after the selection of an action by a user. The positive feedback may be displayed either before or after the completion of the selected action. In some embodiments, a display of negative feedback may be provided to a user. In some embodiments, the user interface may provide negative feedback by displaying a statement. In some embodiments, the user interface may provide negative feedback by displaying an image. In some embodiments, the user interface may provide negative feedback by displaying a negative effect to a user's score. In a plurality of embodiments, negative or positive feedback may be provided by any form of audio visual means capable of providing user either positive or negative feedback to a user, including any audio and visual means.

Figure 10:
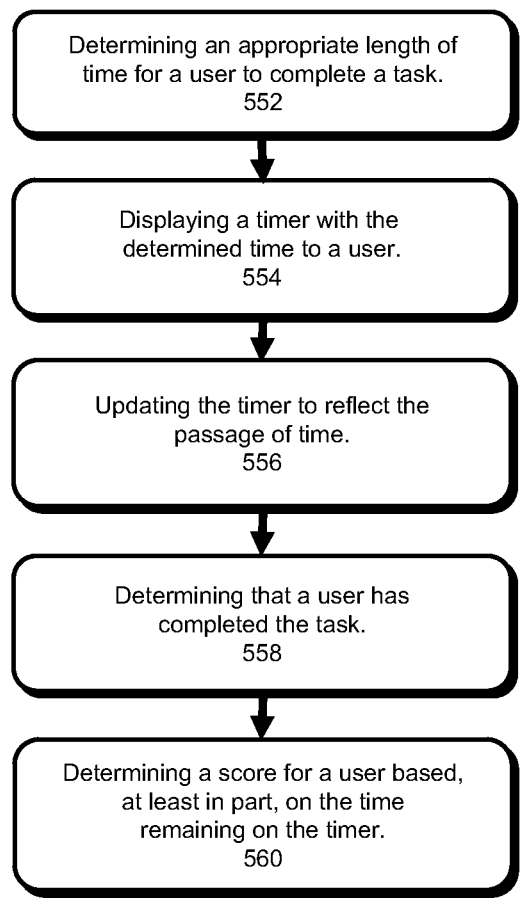
FIG. 10 is a flow diagram of a methods for timing the completion of tasks by users according to one embodiment of the present disclosure.

In reference now to FIG. 10, an embodiment of a method for timing users to complete tasks is shown. An appropriate length of time for a user to complete a task is determined 552. In some embodiments, the length of time for a user to complete a task is determined 552 based, at least in part, on the complexity of the task. The determined time for a user to complete a task is displayed 554 to a user. A timer with the determined time is displayed 554 to a user. The time is updated 556 to reflect the passage of time. A determination 558 is made that a user has completed the task. A score for the user is determined 560 based, at least in part, on the passage of time. In some embodiments, a score for a user is determined 560 based, at least in part, on the time remaining on the timer. In some embodiments, a score for a user is determined 560 based, at least in part, on a measure of complexity of the task. In some embodiments, a timer may be displayed upon a user opening a task in a task list. In some embodiments, a timer may be displayed upon a user opening a file. In some embodiments, a timer may be displayed upon starting an application. In some embodiments, an application may track a user's use of his or her computer and develop determinations of an appropriate time for a user to complete a task as a user opens or closes different files or application. In some embodiments, the appropriate length of time for completing an action may be determined according to a predetermined length of time set by the user. In some embodiments, a determination 558 that a user has completed a task may be done automatically at the completion of said task by a user. In other embodiments, a determination 558 that a user has completed a task is made by receiving an indication by the user that the task has been completed.

Tasks may be generally understood as any activity which may be accomplished by a user through a computing device, such as a computer, laptop, tablet computer, or mobile phone. In some embodiments, a task may be selecting an action to be applied to an electronic message. In some embodiments, a task may be selecting an action to be applied to a document. In some embodiments, a task may be removing a message from an inbox. In some embodiments, a task may be selecting an action to be applied to an application. In some embodiments, a task may be reviewing a document. In some embodiments, a task may be drafting a document. In some embodiments, a task may be reviewing or visiting a website. In some embodiments, a task may be collecting information from websites. In some embodiments, a task may be deleting files or folders. In some embodiments, a task may involve organizing or rearranging documents. In some embodiments, a task may be the completion of a form or survey. In some embodiments, a task may be the performance of some administrative function. In some embodiments, a task may be an item in a task list provided by an application on the user's computer. In some embodiments, a task may be an item on a task list provided by some internet service. In some embodiments, a task may be an item on a task list provided by an online service. In some embodiments, a task may be a task organized in Microsoft Outlook's "Tasks" feature. In some embodiments, a task may be a task organized by the online service "Google Tasks" provided by Google, Inc. In some embodiments, a task may be a task organized by the "Remember the Milk" online service available at http://www.rememberthemilk.com. In some embodiments, tasks may be synchronized with a user's calendar. In some embodiments, a task may be editing a document. In some embodiments, a task may be revising a document. In some embodiments, a task is not store in a task list. In some embodiments, an application may monitor a user's use of his or her computer to determined when the completion of tasks should be timed. In some embodiments, a request by a user to time the completion of a task may be received.

In some embodiments, a task may be a task organized by a task list program. In some embodiments, a task may be a task organized by a task list service provider. In some embodiments, a task may be a task organized by a task list service provider. In some embodiments, a task may not be a organized by a task list program or service provider. In some embodiments, an application may monitor the use of a user's computer and determine when the user begins performance of a task to which the present disclosure may be applied.

In some embodiments, an appropriate length of time for a user to complete a task may be determined 552 based, at least in part, on a user's selection of a time by which to complete the task. In such embodiments, times by which to complete the task may be suggested to the user. In such embodiments, any systems and methods provided in the present disclosure for suggesting times in the context of electronic messages apply more generally to suggesting times by which to complete a task. In some embodiments, a suggested time is determined based upon a measure of the complexity of the task. In some embodiments, a suggested time is determined based upon the contents of a document if the task involves a document.

The features of the present disclosure which may specifically refer to embodiments of the present invention as applied to the management of electronic messages apply with equal force to more generalized embodiments of systems and methods for applying game mechanics to the completion of tasks. For example, systems and methods for deferring action on tasks are contemplated by the present disclosure in similar fashion as described in the context of deferring action on electronic messages. The various embodiments for determining scores in the context of managing electronic messages are also contemplated in the context of completing tasks. The various embodiments for timing a user's selection of an action to be applied to an electronic message are also contemplated in the context of the completion of tasks by users. Each and every feature and element of the present disclosure as described in the context of managing electronic messages is contemplated in the context of completing tasks.

It is understood by those skilled in the art that, unless expressly required, the steps of the various methods described herein need not be performed in any particular order.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program", "software", or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. In a networked computer system, a method for managing e-mail messages, the method comprising:
   retrieving, at a local machine, an e-mail message from an e-mail inbox associated with a user which is stored on a server that is in communication with the local machine via a network;

providing, via a user interface on a display device associated with the local machine, the e-mail message to the user;

providing, via the user interface on the display device associate with the local machine, the user with a plurality of actions which may be applied to the e-mail message;

determining, via at least one processor at the server, an amount of time associated with each of said plurality of actions;

determining, via the at least one processor at a server, that a user has selected one of said actions from the user interface;

determining, via the at least one processor at a server, a score of performance for the user based, at least in part, on an amount of time elapsed between displaying the contents of the e-mail message and a time after selection of the action relative to said amount of time associated with the selected action;

adding, via the-at least one processor at a server, the determined score of performance for the user to a total score of performance for the user; and providing, via the user interface on the display device associated with the local machine, positive feedback to the user at a time after the selection of an action wherein said positive feedback comprises at least one of: a statement, an image, a series of images, a video, an animation, the determined score of performance for the user, the total score of performance for the user, and audio.

2. The method of claim 1 further comprising removing the e-mail message from the inbox upon completion of the selected action.

3. The method of claim 1 wherein the action is selected from the group consisting of "Reply", "Reply All", "Forward", "Label", "Defer", "Archive", "Delete", or "Skip".

4. The method of claim 1 wherein determining a score of performance for the user is further based at least in part on the contents of the e-mail message.

5. The method of claim 4 wherein determining a score of performance for the user is further based at least in part on a measurement of the complexity of the e-mail message.

6. The method of claim 1 further comprising providing a new e-mail message from the inbox to the user.

7. The method of claim 1 further comprising providing a representation of a timer to a user which changes in response to the selection of the selected action.

8. The method of claim 7 wherein the timer is set, at least in part, according to the contents of the e-mail message.

9. The method of claim 7 wherein the timer is set, at least in part, according to a measure of the complexity of the e-mail message.

10. The method of claim 1 further comprising providing a representation of how many e-mail messages remain in either a predetermined subset of the inbox or the entire inbox.

11. The method of claim 1 wherein the selected action is one to defer the e-mail message, further comprising:
requesting that a user select a time at which to return the e-mail message to the inbox;
receiving the user's selection of a time at which to return the e-mail message to the inbox;
removing the e-mail message from the inbox;
returning the e-mail message to the inbox at the time selected by the user.

12. The method of claim 11 further comprising providing the user with a suggested time for returning the e-mail message to the inbox.

13. The method of claim 12 wherein the suggested time is determined at least in part by the contents of the e-mail message.

14. The method of claim 1 further comprising providing negative feedback in response to the total elapsed time from providing an e-mail message to the user and a period of time before a user selects an action.

15. An apparatus for managing e-mail messages across a network, the apparatus comprising:
at least one processor at a server, the at least one processor:
sending, to a local machine, an e-mail message from an e-mail inbox associated with a user which is stored on the server that is in communication with the local machine via a network;
provides, via a user interface on a display device associated with the local machine, the e-mail message to the user;
provides, via the user interface on the display device associated with the local machine, the user with a plurality of actions which may be applied to the e-mail message;
determines an amount of time associated with each of said plurality of actions;
determines that a user has selected one of said actions from the user interface;
determines a score of performance for the user based, at least in part, on an amount of time elapsed between displaying the contents of the e-mail message and a point in time after selection of the action relative to said amount of time associated with the selected action;
adds the determined score of performance for the user to a total score of performance for the user; and
provides, via the user interface on the display device associated with the local machine, positive feedback to the user at a time after the selection of an action wherein said positive feedback comprises at least one of: a statement, an image, a series of images, a video, an animation, the determined score of performance for the user, the total score of performance for the user, and audio.

16. A computer-readable non-transitory storage medium encoded with computer-readable instructions that, as a result of being executed by a computing device, control the computing device to perform a method for managing e-mail messages, the method comprising:
retrieving, at a local machine, an e-mail message from an e-mail inbox associated with a user which is stored on a server that is in communication with the local machine via a network;
providing, via a user interface on a display device associated with the local machine, the e-mail message to the user;
providing, via the user interface on the display device associate with the local machine, the user with a plurality of actions which may be applied to the e-mail message;
determining, via at least one processor at the server, an amount of time associated with each of said plurality of actions;
determining, via the at least one processor at a server, that a user has selected one of said actions from the user interface;
determining, via the at least one processor at a server, a score of performance for the user based, at least in part, on an amount of time elapsed between displaying the contents of the e-mail message and a time after selection of the action relative to said amount of time associated with the selected action;

adding, via the-at least one processor at a server, the determined score of performance for the user to a total score of performance for the user; and providing, via the user interface on the display device associated with the local machine, positive feedback to the user at a time after the selection of an action wherein said positive feedback comprises at least one of: a statement, an image, a series of images, a video, an animation, the determined score of performance for the user, the total score of performance for the user, and audio.

* * * * *